(12) United States Patent
Zeller et al.

(10) Patent No.: US 12,084,348 B2
(45) Date of Patent: *Sep. 10, 2024

(54) METHODS AND SYSTEMS FOR MICROWAVE ASSISTED PRODUCTION OF GRAPHITIC MATERIALS

(71) Applicant: H QUEST VANGUARD, INC., Pittsburgh, PA (US)

(72) Inventors: Kurt W. Zeller, Pittsburgh, PA (US); George L. Skoptsov, Pittsburgh, PA (US); Evan T. Musselman, Pittsburgh, PA (US)

(73) Assignee: H QUEST VANGUARD, INC., Pittsburgh, PA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/806,619

(22) Filed: Jun. 13, 2022

(65) Prior Publication Data

US 2022/0371896 A1 Nov. 24, 2022

Related U.S. Application Data

(63) Continuation of application No. 15/997,495, filed on Jun. 4, 2018, now Pat. No. 11,358,869, which is a
(Continued)

(51) Int. Cl.
*C01B 32/184* (2017.01)
*B01J 19/08* (2006.01)
(Continued)

(52) U.S. Cl.
CPC .......... *C01B 32/184* (2017.08); *B01J 19/088* (2013.01); *B01J 19/126* (2013.01); *B01J 19/129* (2013.01);
(Continued)

(58) Field of Classification Search
CPC ..... C01B 32/184; C01B 32/205; C01B 32/20; C01B 32/152; C01B 32/18; C01B 32/186;
(Continued)

(56) References Cited

U.S. PATENT DOCUMENTS

| 5,063,329 A | 11/1991 | Okamoto |
| 6,099,696 A | 8/2000 | Schwob et al. |

(Continued)

FOREIGN PATENT DOCUMENTS

| CA | 2951878 A1 | 12/2015 |
| CN | 103818894 A | 5/2014 |

(Continued)

OTHER PUBLICATIONS

International Search Report and Written Opinion mailed Oct. 13, 2022 in Application No. PCT/US22/72385.
(Continued)

*Primary Examiner* — Xiuyu Tai
(74) *Attorney, Agent, or Firm* — Fox Rothschild LLP

(57) ABSTRACT

Systems and methods for plasma based synthesis of graphitic materials. The system includes a plasma forming zone configured to generate a plasma from radio-frequency radiation, an interface element configured to transmit the plasma from the plasma forming zone to a reaction zone, and the reaction zone configured to receive the plasma. The reaction zone is further configured to receive feedstock material comprising a carbon containing species, and convert the feedstock material to a product comprising the graphitic materials in presence of the plasma.

16 Claims, 6 Drawing Sheets

Related U.S. Application Data continuation-in-part of application No. 15/671,584, filed on Aug. 8, 2017, now Pat. No. 9,987,611.

(51) Int. Cl.
  *B01J 19/12* (2006.01)
  *H05H 1/30* (2006.01)
  *H05H 1/46* (2006.01)

(52) U.S. Cl.
  CPC ........ *H05H 1/30* (2013.01); *B01J 2219/0875* (2013.01); *B01J 2219/0894* (2013.01); *B01J 2219/0896* (2013.01); *B01J 2219/0898* (2013.01); *H05H 1/4622* (2021.05)

(58) Field of Classification Search
  CPC ....... C01B 32/164; C01B 32/50; C01B 32/40; C01B 32/15; C01B 32/158; C01B 32/80; B01J 19/088; B01J 19/126; B01J 19/129; B01J 2219/0875; B01J 2219/0894; B01J 2219/0896; B01J 2219/089; B01J 12/002; B01J 2219/0869; B01J 2219/0883; B01J 2204/002; B01J 2219/1206; B01J 2219/1269; B01J 2219/0809; H05H 1/30; H05H 1/4622; H05H 1/46; H01J 37/3244; H01J 37/32229; H01J 37/32192; H01J 37/32844; H01J 37/32266; H01J 2237/334; H01J 2237/332; C23C 16/26; C23C 16/453; C23C 16/511; C23C 16/515; H01L 21/31116; H01L 21/32136; H01L 21/02274; H01L 21/28556; Y02C 20/30; B82Y 40/00

See application file for complete search history.

(56) References Cited

U.S. PATENT DOCUMENTS

| | | | |
|---|---|---|---|
| 6,156,256 | A | 12/2000 | Kennel |
| 6,207,023 | B1 | 3/2001 | Cha |
| RE37,853 | E | 9/2002 | Detering et al. |
| 6,689,192 | B1 | 2/2004 | Phillips et al. |
| 7,132,621 | B2 | 11/2006 | Kumar et al. |
| 7,591,989 | B2 | 9/2009 | Smiljanic et al. |
| 7,758,838 | B2 | 7/2010 | Hung et al. |
| 8,071,906 | B2 | 12/2011 | Smiljanic et al. |
| 8,486,363 | B2 | 7/2013 | Hung et al. |
| 8,486,364 | B2 | 7/2013 | Vanier et al. |
| 8,784,617 | B2 | 7/2014 | Novoselov et al. |
| 8,834,827 | B2 | 9/2014 | Simard et al. |
| 9,221,688 | B2 | 12/2015 | Hung et al. |
| 9,293,302 | B2 | 3/2016 | Risby et al. |
| 9,334,168 | B2 | 5/2016 | Fullerton et al. |
| 9,767,992 | B1 | 9/2017 | Stowell et al. |
| 9,812,295 | B1 | 11/2017 | Stowell |
| 9,862,602 | B1 | 1/2018 | Riso et al. |
| 9,862,606 | B1 | 1/2018 | Cook et al. |
| 9,987,611 | B1 | 6/2018 | Strohm et al. |
| 9,997,334 | B1 | 6/2018 | Anzelmo et al. |
| 2007/0029291 | A1 | 2/2007 | Boulos et al. |
| 2009/0031988 | A1 | 2/2009 | Shiraishi et al. |
| 2010/0048975 | A1 | 2/2010 | Uhm et al. |
| 2010/0093187 | A1 | 4/2010 | Lee et al. |
| 2010/0301212 | A1 | 12/2010 | Dato et al. |
| 2010/0314788 | A1 | 12/2010 | Hung et al. |
| 2012/0326803 | A1 | 12/2012 | Lee |
| 2013/0084237 | A1 | 4/2013 | Vanier et al. |
| 2014/0054504 | A1 | 2/2014 | Yoon et al. |
| 2014/0150713 | A1 | 6/2014 | Coe et al. |
| 2014/0170057 | A1 | 6/2014 | Huang et al. |
| 2015/0041309 | A1 | 2/2015 | Spitzl |
| 2015/0315476 | A1 | 11/2015 | Skoptsov et al. |
| 2016/0243518 | A1 | 8/2016 | Spitzl |
| 2017/0022064 | A1 | 1/2017 | Huang et al. |
| 2017/0113935 | A1 | 4/2017 | Pennington et al. |
| 2018/0099871 | A1 | 4/2018 | Tanner et al. |
| 2018/0138017 | A1 | 5/2018 | Stowell |
| 2019/0047865 | A1 | 2/2019 | Zeller et al. |
| 2020/0402768 | A1 | 12/2020 | Stowell et al. |

FOREIGN PATENT DOCUMENTS

| | | |
|---|---|---|
| RU | 120309 U1 | 9/2012 |
| WO | 2015189643 A1 | 12/2015 |
| WO | 2017196198 A2 | 11/2017 |

OTHER PUBLICATIONS

Menendez et al., Thermal Treatment of Active Carbons: A Comparison Between Microwave and Electrical Healing, International Microwave Power Institute, Journal of Microwave Power and Electromagnetic Energy, vol. 34, No. 3, 1999, pp. 137-143.

Dawson et al., A System to Investigate the Remediation of Organic Vapors Using Microwave-Induced Plasma with Fluidized Carbon Granules, Review of Scientific Instruments, vol. 80, No. 3, 2009, pp. 1-13.

Lebedev, Yu. A., Microwave Discharges at Low Pressures and Peculiarities of the Processes in Strongly Non-Uniform Plasma, Plasma Sources Science and Technology, vol. 24, Oct. 2015, pp. 1-39.

Jahanmiri et al., Naphtha Cracking Through a Pulsed DBD Plasma Reactor: Effect of Applied Voltage, Pulse Repetition Frequency and Electrode Material, Chemical Engineering Journal, vol. 191, May 2012, pp. 416-425.

Hunt et al., Microwave-Specific Enhancement of the Carbon-Carbon Dioxide (Boudouard) Reaction, The Journal of Physical Chemistry, 2013, vol. 117, pp. 26871-26880.

Khani et al., Study on the Feasibility of Plasma (DBD Reactor) Cracking of Different Hydrocarbons (n-Hexadecane, Lubricating Oil, and Heavy Oil), IEEE Transactions on Plasma Science, Sep. 2014, pp. 1-9.

Taghvaei et al., Hydrogen Production Through Plasma Cracking of Hydrocarbons: Effect of Carrier Gas and Hydrocarbon Type, The Chemical Engineering Journal, vol. 226, 2013, pp. 384-392.

Sekaran et al., Microwave Heating Characteristics of Graphite Based Powder Mixtures, International Communications in Heat and Mass Transfer, vol. 48, 2013, pp. 22-27.

Ahmed et al., Decomposition of Hydrocarbons to Hydrogen and Carbon, Applied Catalysis A: General, May 2009, pp. 1-24.

Rahimpour et al., Combination of Non-Thermal Plasma and Heterogeneous Catalysis for Methane and Hexadecane Co-Cracking: Effect of Voltage and Catalyst Configuration, Chemical Engineering Journal, vol. 219, Mar. 2013, pp. 245-253.

Lam et al., Pyrolysis Using Microwave Absorbents as Reaction Bed: An Improved Approach to Transform Used Frying Dil into Biofuel Product with Desirable Properties, Journal of Cleaner Production, vol. 147, Mar. 2017, pp. 263-272.

Torres et al., Hydrogen and Multiwall Carbon Nanotubes Production by Catalytic Decomposition of Methane: Thermogravimetric Analysis and Scaling-Up of Fe—Mo Catalysts, International Journal of Hydrogen Energy, Mar. 2014, pp. 3698-3709.

Omarov et al., On the Theory of Plasma Streamer Development, Bulletin of the Lebedev Physics Institute, 2009, vol. 36, No. 10, pp. 310-315.

Yamshchikov et al., Pulse vol. Discharges in High Pressure Gases, 12th International Conference on Gas Discharge Plasmas and Their Applications, Journal of Physics: Conference Series, vol. 652, 2015, p. 1-5.

Tatarova E. et al., Towards large-scale in free-standing graphene and N-graphene sheets, Scientific Reports, 7:10175, Aug. 31, 2017.

Tatarova E. et al., Microwave plasma based single step method for free standing graphene synthesis at atmospheric conditions, Applied Physics Letters, 103 134101 (2013).

Dato A. et al., Substrate-Free Gas-Phase Synthesis of Graphene Sheets, Nano Letters, 2008, vol. 8, No. 7, pp. 2012-2016.

(56) References Cited

OTHER PUBLICATIONS

Gonzalez-Aguilar J. et al., Carbon nanostructures production by gas-phase plasma processes at atmospheric pressure, Journal of Physics D: Applied Physics, vol. 40 (2007) pp. 2361-2374.

Tian M. et al., Synthesis of nanostructured carbons by the microwave plasma cracking of methane, Carbon vol. 51 (2013) pp. 243-248.

Karengin, Alexander G., Plasma Processes and Technologies, Tomsk, Publications of Tomsk Polytechnical University, 2009.

Karengin, Alexander G., Plasma Processes and Technologies, 2009.

METHODS AND SYSTEMS FOR MICROWAVE ASSISTED PRODUCTION OF GRAPHITIC MATERIALS

RELATED APPLICATIONS AND CLAIM OF PRIORITY

This patent document claims priority to, and is a continuation of, U.S. patent application Ser. No. 15/997,495, filed Jun. 4, 2018, which claims priority to and is a continuation-in-part of U.S. patent application Ser. No. 15/671,584 filed Aug. 8, 2017, now U.S. Pat. No. 9,987,611 granted Jun. 5, 2018. The disclosure of both of the priority applications are fully incorporated herein by reference.

STATEMENT OF GOVERNMENT-SPONSORED RESEARCH

This invention was made with government support under grant number DE-SC0017227, awarded by the United States Department of Energy, Small Business Innovation Research. The government has certain rights in the invention.

BACKGROUND

Graphene is a two-dimensional structure that includes tightly packed $sp^2$ carbon atoms forming a lattice honeycomb structure of a desired thickness. Graphene has excellent electrical conductivity, thermal conductivity and optical properties, and has many potential applications. However, a major obstacle in the widespread use of graphene is the lack of an economically viable method of graphene synthesis at commercially relevant scales. Current methods for production of graphene include micromechanical cleavage methods, thermal expansion methods, oxidation reduction methods, chemical vapor deposition methods, laser ablation, or the like. However, these methods have low yields, cannot be scaled up, are expensive, and/or produce graphitic materials with imperfections, impurities, variable thicknesses, etc.

Microwave plasmas driven by surface waves have also been used to generate carbon nanostructures (including graphitic materials) by passing vaporized ethanol or other carbon feedstock through a microwave argon plasma environment. The microwave plasma clacks the carbon containing feedstock into carbon species which are subsequently recombined to form graphitic materials. However, existing methods are generally limited by low conversion yields, high energy requirements, operation at low pressure, and low feed rates, which limits scale-up for commercial operation. Conventional challenges of microwave plasma processes stem from "fouling" of the microwave-transparent containment vessel (typically, a quartz, silica, or ceramic tube), used to isolate the reaction zone from the power delivery system. Thus, microwave driven non-thermal plasma apparatuses are fundamentally limited in feedstock throughput, maximum feedstock concentration, and conversion efficiency due to deposition of materials on the surface of this dielectric barrier. Carbon or other deposits absorb incident microwave energy, potentially resulting in destructive thermal runaway and/or arcing, drastically reducing energy efficiency, and generally disrupting the energy transfer and fluid dynamics of the reaction zone. Typical methods of preventing or reducing fouling require dilution of the feedstock material with inert gases or reduction of power density and material density (pressure). These methods further reduce throughput and energy efficiency, driving up the operational and capital costs.

Hence, there is a need for a system and method that allows for scalable, continuous, and cheaper conversion of feedstock materials to value-added products, including graphitic materials.

SUMMARY

A system is provided for utilizing microwave radiation to generate non-thermal plasma which facilitates the conversion of feedstock materials to a product.

In one aspect, a system is provided for plasma based synthesis of graphitic materials. In an embodiment, the system may include a plasma forming zone configured to generate a plasma from radio-frequency radiation, an interface element configured to transmit the plasma from the plasma forming zone to a reaction zone, and a the reaction zone configured to receive the plasma. The reaction zone is further configured to receive feedstock material comprising a carbon containing species, and convert the feedstock material to a product comprising the graphitic materials in presence of the plasma. The radio-frequency radiation may be microwave radiation. The plasma may be non-thermal plasma comprising a plurality of streamers.

In an embodiment, the plasma forming zone may include a radiation source, and a discharge tube coupled to the radiation source configured to receive a plasma forming material. The discharge tube may be made from a material that is transparent to the radio-frequency radiation. Optionally, the plasma forming material may include one or more of the following: argon, hydrogen, helium, neon, krypton, xenon, carbon dioxide, nitrogen, and water. A waveguide may be configured to couple the radiation source to the discharge tube. Alternatively and/or additionally, the system may include a reaction tube configured to surround the discharge tube in the plasma forming zone to form an annulus. The feedstock material flows in the annulus through the plasma forming zone before entering the reaction zone. A dielectric strength of the plasma forming material is less than a dielectric strength of the feedstock material. Optionally, the feedstock material may be introduced directly into the reaction zone without being exposed to the radio-frequency radiation in the plasma forming zone.

In one or more embodiments, the reaction zone may include a reaction vessel formed from material that is opaque to the radio-frequency radiation. The reaction vessel may also include a resonant cavity.

In at least one embodiment, the plasma transmitted from the plasma forming zone to the reaction zone may form a dense plasma head that is configured to transmit the radio-frequency radiation from the plasma forming zone to the reaction zone.

In an embodiment, the reaction zone is further configured to receive a process gas.

In one or more embodiments, the feedstock material also comprises molecular hydrogen. Optionally, a molar ratio of the carbon containing species to the molecular hydrogen in the feedstock material is about 5:1 to about 1:1. In an embodiment, the feedstock material may include one or more of: aromatic, alkylated aromatic, paraffinic, olefinic, cycloolefin, napthenic, alkane, alkene, alkyl cycloalkane, alkylated cycoalkane, alkyne, alcohol, and heteroatom hydrocarbons. Additionally and/or alternatively, the feedstock material may include: methane, ethane, propane, butane, syngas, natural gas, methanol, ethanol, propanol, butanol, carbon dioxide, hexane, benzene, paraffins, polyaromatics, naphthalene, or a combination thereof.

In certain embodiments, the plasma forming material may include one or more first materials selected from the group consisting of: argon, hydrogen, helium, neon, krypton, xenon, carbon dioxide, nitrogen, and water.

In an embodiment, the graphitic material may be nano-graphene sheets, semi-graphitic particles, amorphous particles, or a combination thereof. The lateral dimensions of the nano-graphene sheets may be about 50 nm to about 500 nm. Additionally and/or alternatively, concentration of the nano-graphene sheets in the product may be proportional to a concentration of molecular hydrogen in the feedstock material.

In another aspect, a method is provided for plasma based synthesis of graphitic materials. In an embodiment, the method may include delivering a plasma forming material into a plasma forming zone, exposing the plasma forming material to radio-frequency radiation to generate a plasma, transmitting the plasma from the plasma forming zone to a reaction zone, delivering feedstock material comprising a carbon containing species to the reaction zone, and converting the feedstock material to a product comprising graphitic materials in presence of the plasma.

These and other features and advantages will become apparent from the following detailed description of the presently preferred embodiment(s), taken in conjunction with the accompanying drawings.

BRIEF DESCRIPTION OF DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
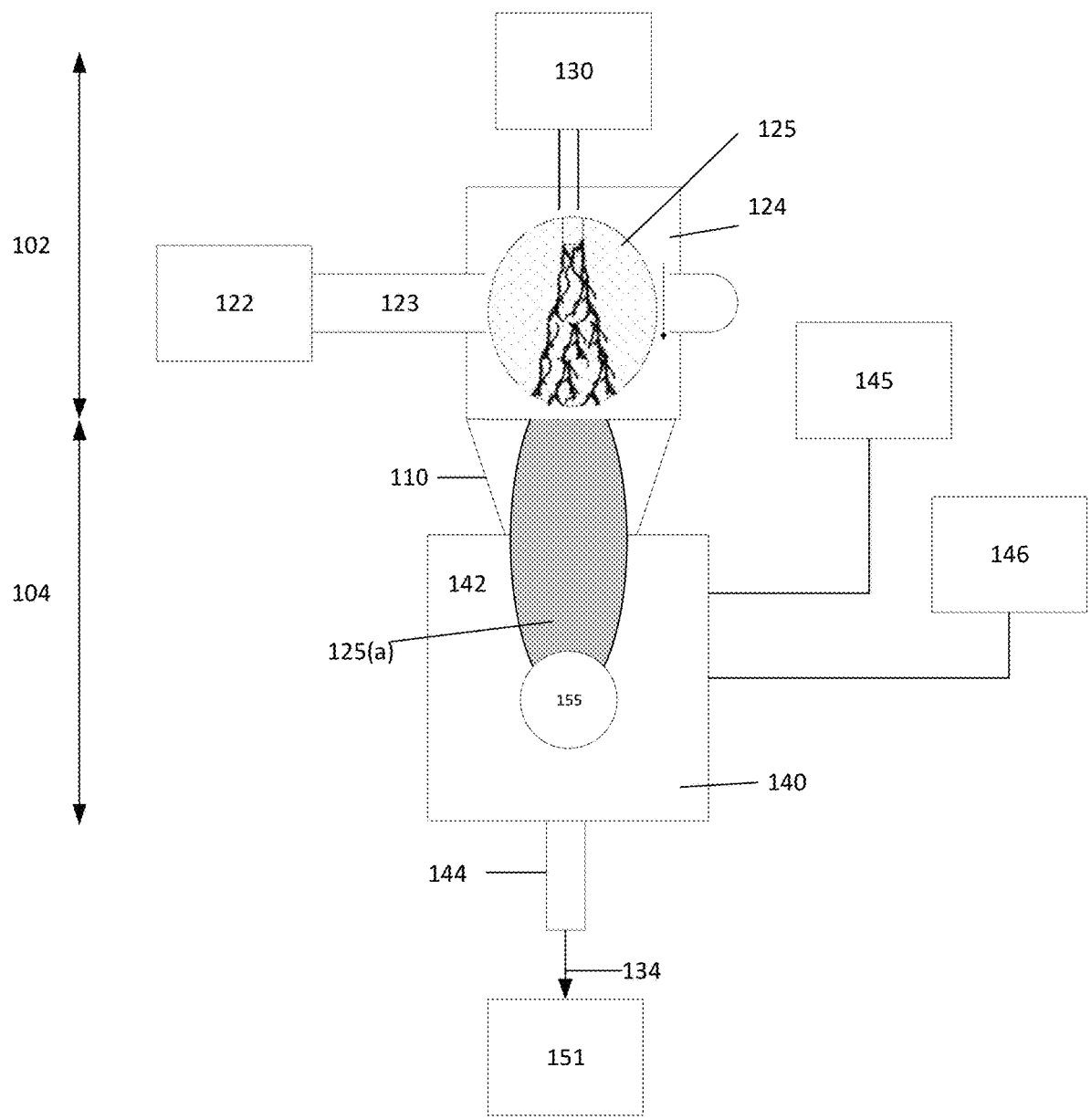
FIG. 1 depicts a block diagram illustrating a first embodiment of a system for processing a precursor material into a product utilizing a non-thermal plasma.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and illustrates certain selected embodiments of devices, systems, and processes that are consistent with the embodiments as claimed herein.

Other than in any operating examples, or where otherwise indicated, all numbers expressing, for example, quantities of ingredients used in the specification and claims are to be understood as being modified in all instances by the term "about". The modifier "about" used in connection with a quantity is inclusive of the stated value and has the meaning dictated by the context (e.g., includes the degree of error associated with measurement of the particular quantity). Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits by applying ordinary rounding techniques.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard variation found in their respective testing measurements.

Unless the meaning is clearly to the contrary, all references made herein to ranges are to be understood as inclusive of the endpoints of the ranges. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Unless the meaning is clearly to the contrary, all references made herein to pressures, such as psi, are to be understood as relative to atmospheric pressure.

The term "graphitic materials" refers to carbon containing solids including but not limited to: amorphous and graphitic carbon blacks of varying crystallinity, carbon onions and rosettes, graphite, graphene, functionalized graphene, and graphitic and graphenic carbon structures (containing one or more layers of graphene sheets), carbon nanotubes, functionalized CNTs (or hybrid CNTs, denoted HNTs), and carbon fiber. The graphitic materials may be flat (completely flat and/or may include curved or curled sections), curved, curled, rosette shaped, spheroidal, or the like.

Generally, the present embodiments relate to utilizing non-thermal plasma for conversion of a precursor material into a product. More specifically, the embodiments relate to utilizing microwave radiation to generate non-thermal plasma which facilitates conversion of hydrogen and/or carbon-containing gases and/or other materials to products such as, without limitation, graphitic materials (including graphene), chemicals (e.g., ammonia) and/or hydrogen.

The current disclosure describes methods and systems for synthesis of graphitic materials that have unique structures and properties (described below). Furthermore, the synthesis of graphene is scalable to different scales. In general, the rate of production of desired material (kg/hr product produced) is a function of the microwave power consumed in the process (kW) divided by the energy requirement per unit feedstock converted (kWhr/kg feedstock converted), and multiplied by the product of feedstock conversion rate (%), product selectivity (%), and the molar mass ratio of product to feedstock. For example, the production rate of graphitic materials may be defined by the power absorbed (kW) divided by the energy per unit feedstock required (kWhr/kg methane converted), multiplied by the feedstock conversion rate (%), multiplied by the molar mass ratio of product to feedstock (12.01 g/mol carbon divided by 16.04 g/mol methane). In an embodiment, the power consumed in the process is about 0.1 to about 1 kW. In another embodiment, the power consumed in the process is about 1 to about 15 kW. In another embodiment, the power consumed in the process is about 1 to about 100 kW. The of energy required per unit feedstock is about 1 Whr/kg to about 100 kWhr/kg of feedstock converted. In an embodiment, the power required per unit feedstock is about 1.24 to about 60 kWhr per kg of methane converted, and more preferably about 5 to about 15 kWhr per kg of methane converted, and most preferably about 9 to about 11 kWhr per kg of methane converted. In an embodiment, the conversion rate of feedstock material is about 0.1% to about 100%, more preferably about 50% to about 100%, and most preferably about 75% to about 99%. In an embodiment, the product selectivity is about 0.1% to about 100%, more preferably about 10% to about 80%, and most preferably about 70% to about 79%.

The graphitic materials can be synthesized at rates of about 1 g/hour to about 1 g/min, about 0.001 Kg/min to about 0.2 Kg/min, about 0.2 Kg/min to about 4.1 Kg/min, or more preferably about 0.7 Kg/min to about 2.4 Kg/min, or most preferably about 1.4 Kg/min to about 2.0 Kg/min. This synthesis of graphitic materials is achieved using a novel microwave plasma reactor, as discussed below. A non-thermal plasma environment provides conditions of high electron temperature and high reactivity near atmospheric pressures (about 0.9-1.1 bar) for decomposition of carbon-containing compounds resulting in a variety of graphitic materials including graphene sheets. Furthermore, one or more reactor zone parameters may be varied to selectively produce one or more types of graphitic materials. For example, molecular hydrogen may be introduced in the reaction zone for minimizing the formation of other carbon nanostructures while increasing the yield of graphene sheets formed in the process. Similarly, the yield and quality of graphene sheets formed may be varied through varying the process parameters. Operation at near atmospheric pressures is desirable due to elimination of costly equipment such as compressors and vacuum pumps, and reduction of demands on reactor hardware (e.g. reactor and piping material thickness and composition), thus resulting in overall reduction of capital costs. In order to achieve specific product types, selectivities, energy and/or conversion efficiencies, or product properties, the process may be operated at various pressures such as, without limitation, highly reduced (about 1 torr-100 torr), reduced (about 100 torr-0.9 bar), increased (about 1.1 bar-2 bar), high (about 2 bar-10 bar), and very high (about 10 bar-40 bar) pressures.

Plasma is a state of matter which contains electrons and at least partially ionized atoms and/or molecules (e.g., ions). Plasma may be, but not limited to, a thermal plasma and a non-thermal plasma. The thermal plasma is in local thermodynamic equilibrium where the electrons, ions, atoms, and molecules of the thermal plasma have a similar temperature. The non-thermal plasma is not in thermodynamic equilibrium.

Thermal plasma can be created by passing a gas, such as argon, through an electric arc. The electric arc will rapidly heat the gas by resistive and radiative heating to a high temperature (>9000 degrees Kelvin) within milliseconds of passing through the arc generating electrons and ions from the gas. The thermal plasma has electrons and ions which have similar energy distributions (e.g., in thermodynamic equilibrium). However, the high temperature(s) may be detrimental to the reactants and/or products. Moreover, generating thermal plasma(s) may have large energy requirements and capital costs. Additionally, utilizing thermal plasma(s) to support conversion of a hydrocarbon results in production of low-value carbon (e.g., soot).

On the other hand, in the non-thermal plasma, the electrons have high electron temperatures comparative to the atoms, molecules, and/or ions which have a relatively low temperature. A non-thermal plasma can be created to have a density of electrons at or above the critical density. The critical density is defined as the electron density at which the electron frequency is equivalent to the electromagnetic driving frequency. At this condition, incident electromagnetic waves exponentially decay in energy magnitude as they propagate within the plasma structure. Additionally, electromagnetic energy is conducted along the surface of the plasma. Hence, the non-thermal plasma may also act as a conduit for transmission of electromagnetic energy similarly to an antenna when it is at or above the critical density.

Thus, systems and methods are provided to efficiently generate non-thermal plasma for conversion of precursor materials to products while avoiding formation of reaction-disrupting deposits. More specifically, the non-thermal plasma (that may also act as a conduit for microwave radiation) and a precursor material are provided to the reaction zone of a vessel. The non-thermal plasma is created by exposing a plasma forming material to microwave radiation outside of the reaction zone. The exposure of the plasma forming material to the microwave radiation selectively converts the plasma forming material to the non-thermal plasma. In an embodiment, the non-thermal plasma may form one or more streamers. Alternatively and/or additionally, the non-thermal plasma may form diffused plasma (e.g., at high powers such as power>4 kW). The precursor material is exposed to the non-thermal plasma in the reaction zone for selective conversion of the precursor material to a product comprising graphitic materials. The product may also include chemicals such as ammonia and/or hydrogen.

Referring now to FIG. 1, a block diagram illustrating a system 100 for processing a precursor material into a product comprising graphitic materials utilizing the non-thermal plasma is shown. As shown in FIG. 1, the system 100 includes a plasma forming zone 102 and a reaction zone 104 coupled via an interface element 110. In an embodiment, the interface element may be a plasma nozzle.

In an embodiment, the plasma forming zone 102 may include a radiation source 122 and a waveguide 123 that directs radiation from the radiation source 122 into a discharge tube 124. The radiation source 122 (e.g., a microwave generator) generates radio frequency (RF) radiation and/or microwave radiation, hereinafter referred to collectively as microwave radiation. The frequencies of the microwave radiation may be in the range from 36 megahertz (MHz) to 300 gigahertz (GHz), more preferably 40 MHz to 6 GHz, and most preferably 400 MHz to 3 GHz. For example, the microwave radiation frequency may be, but is not limited to, 896 MHz, 915 MHz and 2.45 GHz. The radiation source may be, but is not limited to, a magnetron. While FIG. 1 shows a waveguide 123, coaxial, direct, antenna, or other types of couplings between the radiation source 122 and the discharge tube 124 are within the scope of this disclosure. In one embodiment, there is a plurality of radiation sources. The plurality of radiation sources may be coupled to a single waveguide or a plurality of waveguides. Regardless of the coupling method, the microwave radiation generates and sustains a non-thermal plasma within the discharge tube 124 is at a concentration ranging from 100 watts (W) per liter to 20,000 kilowatts (kW) per liter, more preferably between 1 and 300 kW per liter, and most preferably between 100 and 200 kW per liter. In one embodiment, the microwave radiation within the discharge tube 124 is at a concentration less than 2000 kW per liter, more preferably greater than 30 kW per liter, and most preferably greater than 150 kW per liter. At a microwave radiation density within the discharge tube 124 of about 100 kilowatts per liter and about 200 kilowatts per liter (kW/L), the non-thermal plasma transitions from filamentary discharges to diffuse glow discharge.

Examples of a waveguide may include, without limitation, a waveguide surfatron, a surfatron, or a surfaguide. In an example embodiment, a 1.5-6 kW microwave magnetron operating at 2.45 GHz may be used, and the microwave power applied maybe about 3 kW to about 6 kW.

In an embodiment, the discharge tube 124 may be inserted into the waveguide 123 at a perpendicular angle. The discharge tube 124 may be a made of quartz, borosilicate glass, alumina, sapphire, or another suitable dielectric material that promotes the generation and sustenance of a non-thermal plasma 125 when a plasma forming material from a plasma forming material source 130 passes through the discharge tube 124 in the presence of microwave radiation. The inner diameter of the discharge tube 124 may be about 1 mm to about 60 cm, about 1 cm to about 50 cm, about 10 cm to about 40 cm, about 20 cm to about 30 cm. The inner diameter of the discharge tube 124 may vary with the power and frequency of the microwave input; a preferable diameter at a given frequency f can be estimated as between 10% and 20% of ratio c/f where c is the speed of light in vacuum. In an embodiment, the inner diameter of the discharge tube 124 may be about 0.125" to about 0.8", more preferably about 0.6" to about 0.8", most preferably about 0.67". In another embodiment, the inner diameter of the discharge tube 124 may be about 0.335" to about 2.68", more preferably about 1.6" to about 2.144", most preferably about 1.8". The plasma forming material may comprise virtually any material that can be used to generate plasma, such as, but not limited to, the non-thermal plasma 125. For example, the plasma forming material may be, but is not limited to, argon, hydrogen, helium, neon, krypton, xenon, carbon dioxide, nitrogen, synthesis gas, and water vapor (or water in the form of droplets, aerosols, or steam). It is understood that the plasma forming material may not be pure and may contain a variety of impurities as known in the art.

In certain embodiments, an ignitor mechanism may be used to initiate the generation of the non-thermal plasma 125. Alternatively and/or additionally, a plasma initiation mechanism may be used to initiate the generation of the non-thermal plasma 125. An initiation mechanism comprised of a conductive material may be introduced coaxially or otherwise to the inside or end of the discharge tube to provide a source of free electrons and initiate the non-thermal plasma. In certain embodiments, initiation of non-thermal plasma within the discharge tube may be also be facilitated through other means such as reduction of gas pressure within the discharge tube below 1 bar or more preferably below 0.5 bar or most preferably below 0.1 bar with subsequent reintroduction of gas to return to operational pressure. In certain embodiments, available free electrons may be sufficient to initiate plasma without an initiation mechanism.

In an embodiment, gas temperature (i.e., temperature of the non-thermal plasma) at the outlet of the plasma forming zone is about 300 to about 2,000° C., and the electron density within the discharge tube is above the critical density. Specifically, the temperature is about 400 to about 1,500° C., about 500 to about 1200° C., about 600 to about 1000° C., or about 300 to about 500° C. The electron density may be increased by increasing gas pressure, reducing gas flow rates, decreasing discharge tube diameter, or increasing the incident microwave power absorbed by the plasma and/or plasma-forming material.

In an embodiment, absorption of microwave energy promotes electron and ion impacts/collisions within but not limited to a portion of atoms and/or molecules of the plasma forming material which results in ionization of the portion of atoms and/or molecules of the plasma forming material. In one embodiment, the plasma forming material is at least partially ionized (e.g., greater than 0 percent to 100 percent) and converted to the non-thermal plasma 125. Elastic and inelastic collisions between species, such as but not limited to electrons, non-thermal plasma 125, ions, atoms and/or molecules of plasma forming material, radical species, and/or intermediate product(s) present in the discharge tube 124 results in energy transfer either directly or indirectly to the plasma forming material. Energy transfer can excite (and/or increase the energy level) vibrational, electronic, rotational, and translational energy state(s) of the atoms and/or molecules of the plasma forming. In one embodiment, transfer of energy to vibrational and electronic energy states is greater than transfer of energy to translational energy state within the non-thermal plasma 125. In one embodiment, the energy states of the non-thermal plasma are not in thermodynamic equilibrium such that the electron and/or vibrational temperature are greater than rotational, ion, and/or translation temperatures.

In one embodiment, upon subjecting the plasma forming material to the microwave radiation which meets or exceeds the dielectric strength of the plasma forming material, a valence electron is activated and/or excited from a first atom and/or molecule in the plasma forming material. Upon excitation, the valence electron is removed from the first atom and/or molecule within the plasma forming material and accelerated in a select direction based on a first electric field generated by the microwave radiation within the discharge tube 124. The accelerated electron strikes a second atom and/or molecule within the plasma forming material causing removal of an electron from the second atom and/or molecule. The electron removal process progresses through the discharge tube 124 in this manner and results in an electron avalanche. The electrons within the electron avalanche have a first electron temperature.

The electron avalanche comprises an ionized head region which is proximal to the direction of propagation of the electron avalanche and proximal to an adjacently positioned tail region. A space charge is produced by the electron avalanche causing a distortion of a second electric field within the electron avalanche such that free electrons move towards the ionized head region, thereby increasing the strength of the second electric field within the electron avalanche. The increase in the strength of the second electric field facilitates additional electron avalanches to cumulate in the ionized head region causing the quantity of free electrons in the ionized head region to increase, which increases the strength of the second electric field. As the electron avalanche propagates, the positive ions (e.g., the atoms and/or molecules that have at least one electron removed) are left in the tail region of the electron avalanche. The tail region progresses through the discharge tube 124 slower than the ionized head region progresses through the discharge tube 124. An increase in free electrons in the ionized head region causes the first electric field inside of the discharge tube 124 to increase in strength.

As the electron avalanche progresses through the discharge tube 124 and the first electrical field discharge tube 124 increases to a threshold charge, the ionized head region begins to decelerate and the electron temperature of the ionization head region decreases to a second electron temperature. In one embodiment, the second electron temperature is less than the first electron temperature. Following the deceleration, the electron avalanche transitions into a streamer discharge, hereinafter referred to as a streamer. In one embodiment, a streamer is a type of non-thermal plasma with an excess of free electrons. Similarly, in one embodiment, the streamer has a longitudinal size that exceeds its transverse radius. A distortion of the sizing of the streamer results in a radiation intensity (e.g., degree of ionization, electron temperature, etc.) in the longitudinal direction of the streamer that is higher than the radiation intensity in the radial direction of the streamer. In one embodiment, the longitudinal direction of the streamer is relatively parallel to the flow direction of plasma forming material within the discharge tube 124. In embodiment, the radial direction of the streamer is relatively perpendicular to the direction of microwave power propagation.

Upon transition of the electron avalanche to the streamer, the electron temperature within the streamer continues to decrease to a third electron temperature. In one embodiment, the third electron temperature is less than the second electron temperature. In one embodiment, the third electron temperature is between 800 and 6,000 degrees Kelvin, more preferably between 900 and 3,000 degrees Kelvin, and more preferably between 1,000 and 2,500 degrees Kelvin. In one embodiment, the third electron temperature is not subject to an increase in temperature after a threshold microwave radiation density is reached within the discharge tube 124. In one embodiment, the threshold microwave radiation density within the discharge tube 124 is 15 kW per liter, more preferably 9 kW per liter, and more preferably 4 kW per liter. It is understood that the threshold microwave radiation density may be dependent on the reactants introduced to the discharge tube 124 and/or configuration of the discharge tube 124, thus the threshold microwave radiation density may vary from the values illustrated. Additionally, due to the increase of strength in the first and second electrical fields, additional electron avalanche(s) are initiated resulting in additional streamers. The additional electron avalanches may be negative charge directed (e.g., propagating towards a negative charge) and/or positively charge directed (e.g., propagating towards a positive charge).

The streamers within the discharge tube 124 may be transient and dynamically changing, and may transform to diffuse glow plasma at higher power densities. In one embodiment, any single streamer is only present for a short period of time (e.g., less than 1 second). In one embodiment, the non-thermal plasma 125 has a non-uniform radiation intensity (e.g., degree of ionization, electron temperature, etc.) within the discharge tube 124. For example, there is an area(s) of high radiation intensity (e.g., the streamers), and an area(s) of low radiation intensity (e.g., absence of streamers). In one embodiment, the area(s) of high radiation intensity is at the third electron temperature while the area(s) of low radiation intensity is at fourth electron temperature. In one embodiment, the fourth electron temperature is lower than the third electron temperature. Accordingly, the non-thermal plasma 125 may be constantly and/or dynamically changing within the discharge tube 124

The non-thermal plasma 125, which may include streamers and/or diffuse glow plasma, generated in the discharge tube 124 may be transmitted to the reaction zone 104 via an interface element 110, with the microwave radiation. Optionally, microwaves may not be transmitted to the reaction zone 104. Specifically, a dense plasma head 125(*a*) of the non-thermal plasma 125 extends into the reaction zone 104. In an embodiment, the interface element 110 may be a conduit configured to propagate plasma into the reaction zone 104 in a reaction vessel 142. The interface element 110 may also act as a conduit for conducting and emitting microwave energy into reaction zone 104. Additionally, the dense plasma may serve as an antenna or conduit to transmit additional microwaves into the reaction zone 104. Additionally and/or alternatively, any unreacted plasma forming material may also be transmitted into the reaction zone 104. As used herein, "dense plasma head" (or "dense plasma") is the plasma portion that has an electron density that is equal to or greater than the critical density and that is transmitted from the plasma forming zone 102 to the reaction zone 104.

In one embodiment, the reaction vessel 142 may be configured to accept microwave energy via the dense plasma head 125(*a*) through impedance matching or by other means. Alternatively, the reaction vessel 142 may be configured to reject microwave energy via the dense plasma head 125(*a*) through restriction of the dense plasma head inlet diameter to less than 10% of the electromagnetic wavelength used to generate the non-thermal plasma 125.

In an embodiment, the reaction zone 104 may be included within a reaction tube (not shown here) of a reaction vessel 142. Alternatively, the reaction tube may be absent. Specifically, in the system shown herein, a reaction vessel 142 is provided to facilitate processing of the feedstock material. More specifically, the reaction vessel 142 is configured with a resonant cavity 140 and a reaction zone 104 within the cavity 140. In an embodiment, the resonant cavity 140 may have a size such that it is configured to resonate with a fundamental mode shape. For example, the resonant cavity may have size such that it is configured to resonate with a transverse magnetic (TM) mode shape (e.g., a uniaxial transverse magnetic mode shape TM01n). Such transverse magnetic mode shape may promote microwave propagation into the resonant cavity and prevent microwave reflection caused by impedance mismatch. Since the plasma antenna operates in the coaxial mode shape, it can deliver energy to a fundamental mode shape with an axial electric field component.

The reaction zone 104 is configured to facilitate interaction of and/or mixing of various material(s) including the feedstock material in the presence of the dense plasma head 125(a) and/or the microwave radiation. As used herein, the term "precursor" or "feedstock" refers to a substance from which a product comprising a graphitic material is formed. Optionally, the reaction tube may be absent.

In an embodiment, the reaction zone 104 may receive a fluidized bed of feedstock material and/or a process gas from a feedstock source 145 and/or a process gas source 146, respectively, and the dense plasma head 125(a) of the non-thermal plasma 125 from the interface element 110. In an embodiment, the interface element 110 may also transmit microwave radiation in the reaction zone 104. Alternatively, the dense plasma head 125(a) may act as a conduit for the microwave radiation. In the presence of the dense plasma head 125(a) of the non-thermal plasma 125 and the microwave radiation, the non-thermal plasma 125 may grow to fill the cavity 140. In this manner, non-thermal plasma 125 may be sustained and controlled without discharging to conductive walls of the reaction vessel 142. Furthermore, this method of generating plasma outside of the reaction zone allows the reaction to take place outside of the dielectric containment (i.e., the discharge tube) and may reduce or prevent deposition of reaction by-products with non-zero loss tangent onto dielectric materials near the reaction.

The size and/or location of the reaction zone 104 and/or non-thermal dense plasma head 125(a) may be dynamic. For example, in one embodiment, the reaction zone 104 may extend to the reaction vessel boundary. The reaction vessel boundary may be comprised of any known or conceivable material capable of withstanding the heat, pressure(s), and chemical environments associated with generating and/or sustaining the non-thermal plasma. For example, the material of vessel boundary may be a microwave radiation opaque material (e.g., limits penetration of microwave radiation through the material). The microwave radiation opaque material may be, but is not limited to ceramics, carbon-based materials and composites, and metals or metal alloys, such as brass, copper, steel, nickel, stainless steel, titanium, and aluminum, and alloys and combinations thereof. The microwave radiation opaque materials may additionally be coated with high-conductivity materials, including but not limited to silver, gold, carbon materials including graphene, and combinations thereof. In one embodiment, the vessel boundary is constructed of a microwave radiation reflective material. In one embodiment, the vessel is operated at atmospheric pressure. Accordingly, the vessel is configured to withstand the heat, pressure(s), and chemical environment(s) associated with processing the feedstock material.

In an embodiment, the feedstock material in the form of a fluidized bed may be introduced into a reaction tube 141 operably connected to the reaction vessel 142 in the reaction zone 104 at or near the interface element 110 (as shown in FIG. 1). In such an embodiment, the feedstock material is subjected to the dense plasma head 125(a) and associated microwave radiation in the reaction zone 104.

Figure 2:
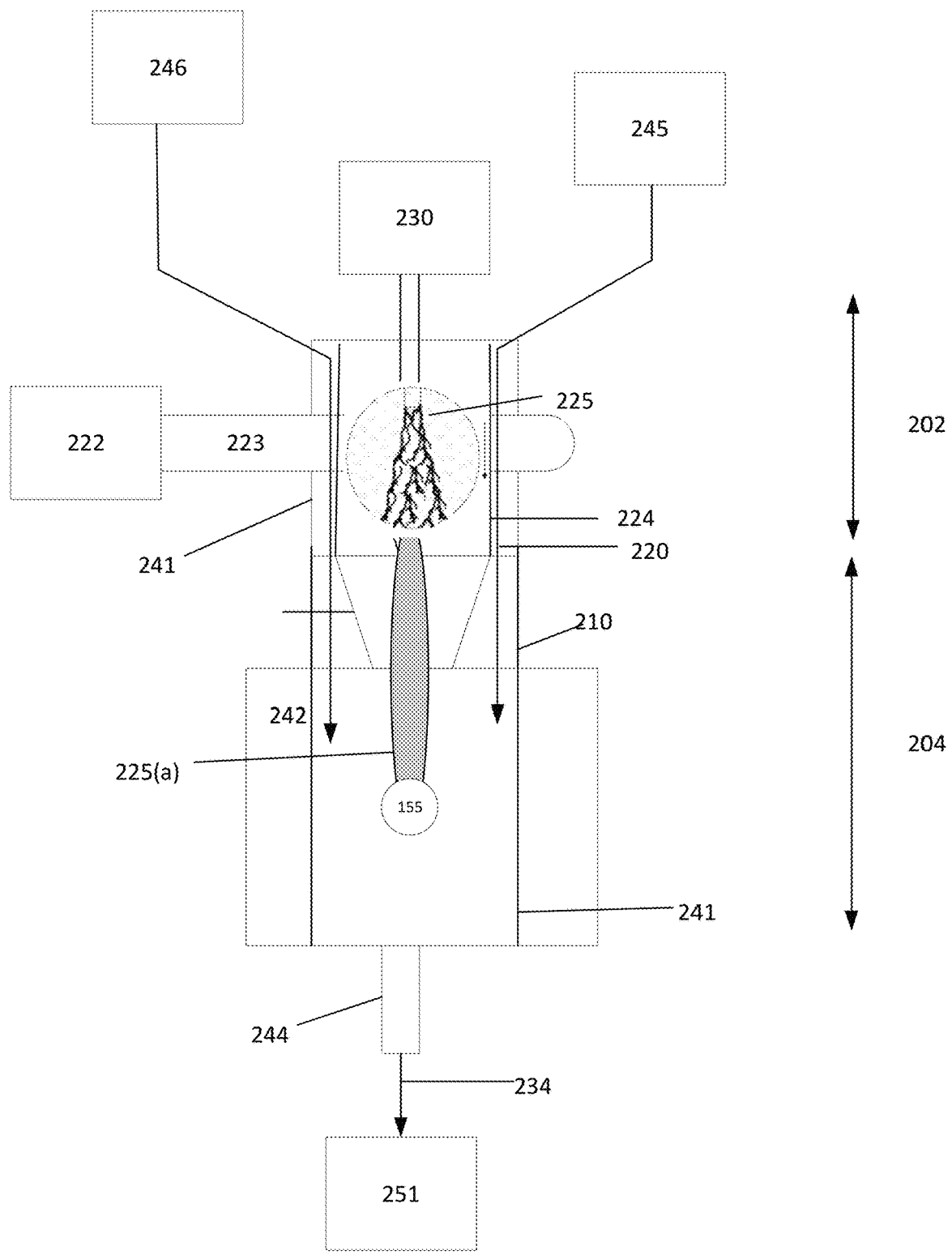
FIG. 2 depicts a block diagram illustrating a second embodiment for processing a precursor material into the product utilizing the non-thermal plasma.

Alternatively and/or additionally, as shown in FIG. 2, the discharge tube 224 may be positioned within a reaction tube 241 operably connected to the reaction vessel 242. The positioning includes forming an annulus (220) between the discharge tube 224 and the reaction tube 241. In one embodiment, the discharge tube 224 is positioned concentrically within the reaction tube 241. The feedstock flow through the reaction tube 241 passes through the annulus 220. For example, the feedstock material may flow through the annulus 220 in the reaction tube 241 into the reaction zone 204. In such an embodiment, the plasma forming material is chosen to have a first dielectric strength that is less than a second dielectric strength of the feedstock material. The lower dielectric strength of the plasma forming material in comparison to the feedstock material facilitates non-thermal plasma 225 generation from the plasma forming material in the plasma forming zone 202 while the feedstock material passes into the reaction zone 204 and is subjected to the dense plasma head 225(a) of the non-thermal plasma in the reaction zone 204 in addition to the microwaves transmitted by the dense plasma heard 125(a). In an embodiment, the feedstock material may be partially ionized by the microwave radiation in the plasma forming zone 202.

The reaction vessel 142 may also include a static and/or fluidized catalytic bed (not shown here), such as various metals, metal oxide salts or powders, carbon material, or other metallic materials or organometallic species which may enhance the reaction caused by dense plasma head 125(a) as described below. Examples of catalysts may include materials containing iron, nickel, cobalt, molybdenum, carbon, copper, silica, oxygen, zeolites or other materials or combinations of any of these materials. Alternatively, the feedstock material may be supplemented with any suitable catalyst or supplemental material. Alternatively, no catalyst may be used. In an embodiment, as the distance between a catalyst bed (in the reaction vessel) and the interface element 110 is increased and/or the diameter of the inlet of the dense plasma head is reduced, the transmitted microwave power intensity reduces, leading to a decrease in the proportion of ionized and activated species, as well as the concentration of free electrons. Thus, through modification of the above distance, diameter of the dense plasma head and/or other parameters, it is possible to vary (or reduce to zero) the exposure of a catalyst bed contained within reaction vessel to microwave radiation, degree of gas ionization, ratio of radical species, and/or other parameters in order to optimize conversion rate, energy efficiency, catalyst durability, and/or other performance metrics of the reaction.

One or more flow distributors may be used to create the fluidized bed of feedstock material and/or catalytic material in the reaction vessel 142. It will be understood that while FIGS. 1 and 2 illustrate a down-flow mode for the feedstock material, up-flow or parallel flow modes are within the scope of this disclosure.

The feedstock and/or catalytic materials may be in powder form (such as coal particles), optionally entrained in a gas such as a process gas (e.g., a mixture of natural gas, hydrogen or argon). In an embodiment, the feedstock material may include hydrogen and/or carbon containing gases, liquids, and other materials such as, without limitation, aromatic alkylated aromatic, paraffinic, olefinic, cycloolefin, napthenic, alkane, alkene, alkyl cycloalkane, alkylated cycoalkane, alkyne, or heteroatom hydrocarbons; methane, ethane, propane, butane, acetylene, syngas, natural gas, hexane, benzene, paraffins, naphthalene, polyaromatics other hydrocarbon gases, hydrogen, carbon monoxide, carbon dioxide, water vapor, hydrogen sulfide, hydrogen cyanide, alcohols (ethanol, methanol, propanol, and others), phenolic, paraffinic, naphthenic, aromatic compounds, and or combinations thereof. The gas flow rate of the feedstock material may be about 10 standard liters per minute (SLPM) to about 100 SLPM, about 20 SLPM to about 90 SLPM, about 30 SLPM to about 70 SLPM, or about 40 SLPM to about 60 SLPM, or about 100 SLPM to about 20,000 SLPM. In certain embodiments, the feedstock may be in vapor phase, when process gas temperature is higher than the boiling point of the feedstock or feedstock fractions and compounds. It may also be in liquid form as an atomized spray, droplets, emulsions, or aerosols entrained in a process gas.

The process gas may include, for example, hydrogen, nitrogen, methane or other compounds of hydrogen and carbon. Multiple process gas sources may be available so that a combination of process gases is directed into the reaction zone. An example process gas combination includes an inert gas such as argon, helium, krypton, neon or xenon. The process gas also may include carbon monoxide (CO), carbon dioxide ($CO_2$), water vapor ($H_2O$), methane ($CH_4$), hydrocarbon gases ($C_nH_{2n+2}$, $C_nH_n$, $C_nH_n$, where n=2 through 6), nitrogen ($N_2$) and hydrogen ($H_2$) gases.

In one embodiment, the gas hourly space velocity (GHSV) is measured at standard temperature and pressure (STP) (e.g., 273.15 degrees Kelvin and 1 atmosphere of pressure) based on a volume of the reaction plasma region 125a and is generally about 1.58E+04 $hr^{-1}$ to about 1.58E+06 $hr^{-1}$, but can be as low as about 1 $hr^{-1}$ to about 100 $hr^{-1}$, and about 100 $hr^{-1}$ to about 1.58e+04 $hr^{-1}$. More preferably, the GHSV is about 5.00E+04 $hr^{-1}$ to about 5.00E+05 $hr^{-1}$, and most preferably the GHSV is about 7.75E+04 $hr^{-1}$ to about 8.85E+05 $hr^{-1}$. Specifically, in an embodiment the GHSV is about 8.27E5 $hr^{-1}$ within the reaction plasma region 125a.

In an embodiment, the non-thermal plasma received in the reaction zone 104 initiates selective conversion of the feedstock material to the product comprising graphitic materials. Products may also include hydrogen and/or chemicals such as ammonia. For example, the streamers or diffused the non-thermal plasma may act as an energy transfer catalyst activating the feedstock material and enabling acceptance of additional microwave energy into the feedstock material. The ions and electrons within the streamers or diffuse non-thermal plasma 125 collide with the feedstock material to selectively activate particular molecular modes resulting in an overall increase in energy efficiency compared with traditional thermodynamic or thermal-catalytic chemical dissociation. The collisions result in energy transfer sufficient to promote cleavage of a bond (e.g., hydrogen atom to a carbon atom bond) of the feedstock material. For example, if the feedstock material is methane, the $H_3C$—H bond is cleaved by electron collisions.

The interaction of streamers or diffuse plasma with the feedstock material occurs at a convergence point 155 within the non-thermal plasma in the reaction zone 104. At the convergence point 155, the non-thermal plasma dynamically changes composition. At the convergence point 155, the non-thermal plasma dynamically changes composition. For example, the streamers converge, and in one embodiment, begin to extinguish (e.g., become less ionized). In one embodiment, the feedstock material receives a threshold amount of energy from the collision(s) with the ions and electrons within the non-thermal plasma and/or receives a threshold amount of energy from the microwave radiation wherein the feedstock material is at least partially ionized (e.g., greater than 0 percent to 100 percent). After receiving the threshold amount of energy, the feedstock material is also ionized forming a non-thermal plasma within the convergence point 155. In one embodiment, the non-thermal plasma formed from the feedstock material has a C2 species temperature range of 1,500 to 5,500 degrees Kelvin, and in one embodiment, a C2 species temperature range of 2,000 to 3,500 degrees Kelvin, and in one embodiment, a C2 species temperature range of 500 to 1,500 degrees Kelvin. In one embodiment, the radiation intensity of the non-thermal plasma 125 is more uniform at the convergence point 155 than at the streamers. Accordingly, the non-thermal plasma 125 changes composition along a distance of the reaction zone (104).

In one embodiment, the feedstock material receives energy from collision(s) with the ions and electrons within the non-thermal plasma comprised of plasma-forming material to selectively dissociate the feedstock material. In a region outside of the dense plasma head region within the reaction zone (104) dissociated species are quenched and preferentially rejoin to form products. In one embodiment, the product comprises a carbon-enriched material and a hydrogen-enriched material. The carbon-enriched material has a hydrogen atom to carbon atom ratio of less than or equal to one. For example, the carbon-enriched material may include, but is not limited to, a graphitic material, amorphous carbon, structured carbon, and ordered carbon. The carbon-enriched material may include graphene of varying lateral dimension and atomic layers, amorphous and carbon blacks, and/or graphite. Carbon-enriched materials may include acetylene, benzene, and polyaromatic materials such as naphthalene, anthracene, phenanthrene, and others. The hydrogen enriched material may include, but is not limited to, hydrogen, ethylene, acetylene, butadiene, butane, and combinations thereof. In one embodiment, the conversion percentage of the feedstock material to the product on a molar basis may be, but is not limited to, at least 5 percent, at least 30 percent, at least 70 percent, at least 90 percent, and at least 99 percent. For example, in one embodiment, the conversion percentage of the feedstock material to the product on a molar basis of may be between 30 and 70 percent. Accordingly, the feedstock material is selectively converted to the product within reaction zone (104).

In one embodiment, the dense plasma head 125(a) of the non-thermal plasma 125 within the reaction zone 104 lowers the effective activation energy required for a chemical reaction, such as the selective conversion of the feedstock material to the product.

In one embodiment, feedstock material is methane. The methane is selectively converted into a carbon enriched material utilizing the system of FIG. 1 according to, but not limited to, the following reactions:

$$CH_4 \rightarrow CH_3 + H \qquad (1)$$

$$CH_4 + H \rightarrow CH_3 + H_2 \qquad (2)$$

$$CH_3 + CH_3 \rightarrow C_2H_6 \qquad (3)$$

$$C_2H_6 \rightarrow C_2H_4 + H_2 \qquad (4)$$

$$C_2H_4 \rightarrow C_2H_2 + H_2 \qquad (5)$$

$$C_2H_2 \rightarrow \text{carbon based material} + H_2 \qquad (6)$$

(7) $CO_2 + H_2 \rightarrow C(s) + H_2O$

In one embodiment, reactions (1)-(7) occur in the reaction zone 104 and at least one of the reactions (1)-(7) is facilitated by the dense plasma head 125(a) of the non-thermal plasma 125. The carbon enriched material produced from methane has a hydrogen atom to carbon atom ratio of less than or equal to one. For example, the carbon enriched material and/or solid carbon may include, but is not limited to, a graphitic material, amorphous carbon, structured carbon, and ordered carbon. The carbon enriched material may include graphene and/or graphite. Accordingly, methane may be selectively converted into graphene and/or graphite utilizing the non-thermal plasma 125.

With respect to reaction (7), in conventional chemistry, conversion of carbon dioxide and hydrogen into water and solid carbon is known as the Bosch reaction and proceeds according to the following reaction: $CO_2+H_2 \rightarrow C(s) \, H_2O$. This reaction may be carried out using the systems and methods disclosed in this disclosure for the production of solid carbon. In one embodiment, a feedstock gas comprising carbon-containing gas such as carbon dioxide or carbon monoxide, and a hydrogen-containing gas such as hydrogen, methane, ethane, acetylene, or mixture thereof is dissociated using the dense plasma head. The radicals formed are then recombined within the reaction zone to form water vapor solid carbon. The feedstock gas may also include, without limitation, syngas, shale gas, or biogas. In one embodiment, the reaction may be catalyzed using, for example, cobalt, nickel, or other transition metal on a support material to facilitate the reaction. Alternatively, no catalyst is added.

In an embodiment, the graphitic materials include graphene sheets that have a size with an X-Y dimension of about 50-100 nm, about 50-500 nm, about 100-400 nm, about 150-350 nm, or about 200-300 nm (i.e., the graphene sheets are nano-graphene sheets). The nano-graphene sheets are formed as a stack of about 2 sheets to about 8 sheets, about 3 sheets to about 7 sheets, about 4 sheets to about 6 sheets, and/or a single sheet. The unique size and morphology of such nano-graphene sheets leads to improvement in barrier properties of the graphene sheets. Furthermore, the pure graphitic composition of the product leads to excellent electrical and thermal conductivity. Additionally and/or alternatively, the graphitic materials produced may also include amorphous and semi-graphitic carbon particles. The differentiation is based on relative oxidation rates, lamellae size and degree of order. In an embodiment, the relative yield of these three carbon "phases"—nano-graphene, amorphous and semi graphitic particles may be controlled by controlling the reaction conditions. In an embodiment, specific graphitic material products are single or few-layer graphene platelets of a lateral dimension 100-200 nm. Graphene platelets may have flat edges. Graphene platelets may be 1-10 layers, more preferably 1-3 layers, or most preferably, single layer. Graphene platelets may be folded, scrolled, curved, flat, or etched. Graphene platelets may be functionalized, chemically pure, or pristine. In another embodiment, graphene platelets are functionalized to include nitrogen, boron, oxygen, or other functional group to enhance dispersability within a media, conductivity, selective adsorbance, or other properties. Specifically, the reaction conditions may be varied to produce graphitic materials that primarily include single layer nano-graphene sheets having lateral have a size with an X-Y dimension of at least 100 nm, and that have flat edges (rather than scrolled and/or etched edges).

For example, the molar ratio of a $CH_4:H_2$ in a feedstock material may be varied to vary the production yields of different graphitic materials (while the flow rate is maintained constant using, for example, argon as a process gas and varying the argon concentration). Increasing the ratio of added $H_2$ in the feedstock material increases the graphitic nature of the products with pristine few-layer graphene sheets and graphitic particles seen at the highest feed $H_2$ content and reduction in the amount of amorphous carbon particles. When increasing the $H_2:CH_4$ ratio, carbon product distribution is observed to shift from more amorphous and/or generic carbon types toward more graphitic/graphenic carbon types. Specifically, selectivity of graphene nanoplatelets increases with increasing $H_2:CH_4$ ratio. The molar ratio of $CH_4:H_2$ in a feedstock material may be between about 5:0 to about 1:1, about 4:1 to about 2:1, about 3:1 to about 2.5:1, or the like.

Figure 3:
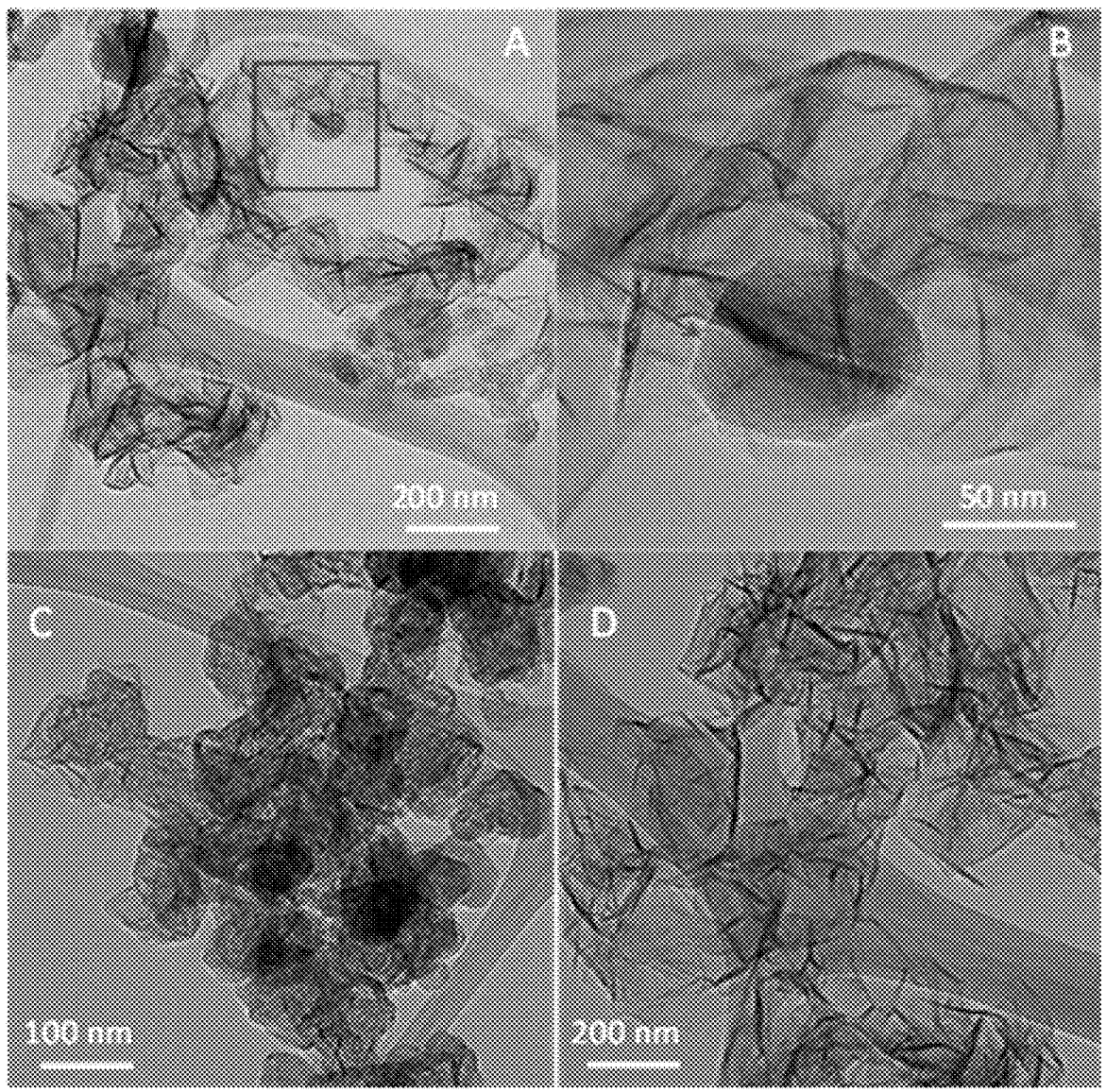
FIG. 3 illustrates the transmission electron microscopy (TEM) images of graphitic materials obtained by processing of methane in the absence of $H_2$, according to an embodiment (TEM images (A) NG sheets with (B) semi-graphitic particles. (C) and (D) represent the morphological variability).

In an example embodiment, in the absence of $H_2$, the graphitic materials include amorphous spheres, semi-graphitic polyhedral particles, and nano-graphene sheets, observed in stacks of 6-10 layers. The amorphous particles appear together, partially fused or merged indicative of their continued growth past coalescence. The semi-graphitic particles have recognizable nanostructure—defined lamellae of extended length and order, characteristic of graphitized forms of carbon blacks. The graphene sheet stacks define the particle boundary, leading to a polyhedral morphology and shell-like appearance. The nano-graphene stacks appear curled and/or co-mingled with these other forms. FIG. 3 illustrates the transmission electron microscopy (TEM) images of the graphitic materials obtained in the absence of $H_2$. In an embodiment, the relative weight percentages of amorphous particles, semi-graphitic particles, and nano-graphene sheets in the absence of $H_2$ was found to be about 30%, about 40%, and about 30%, respectively.

Figure 4:
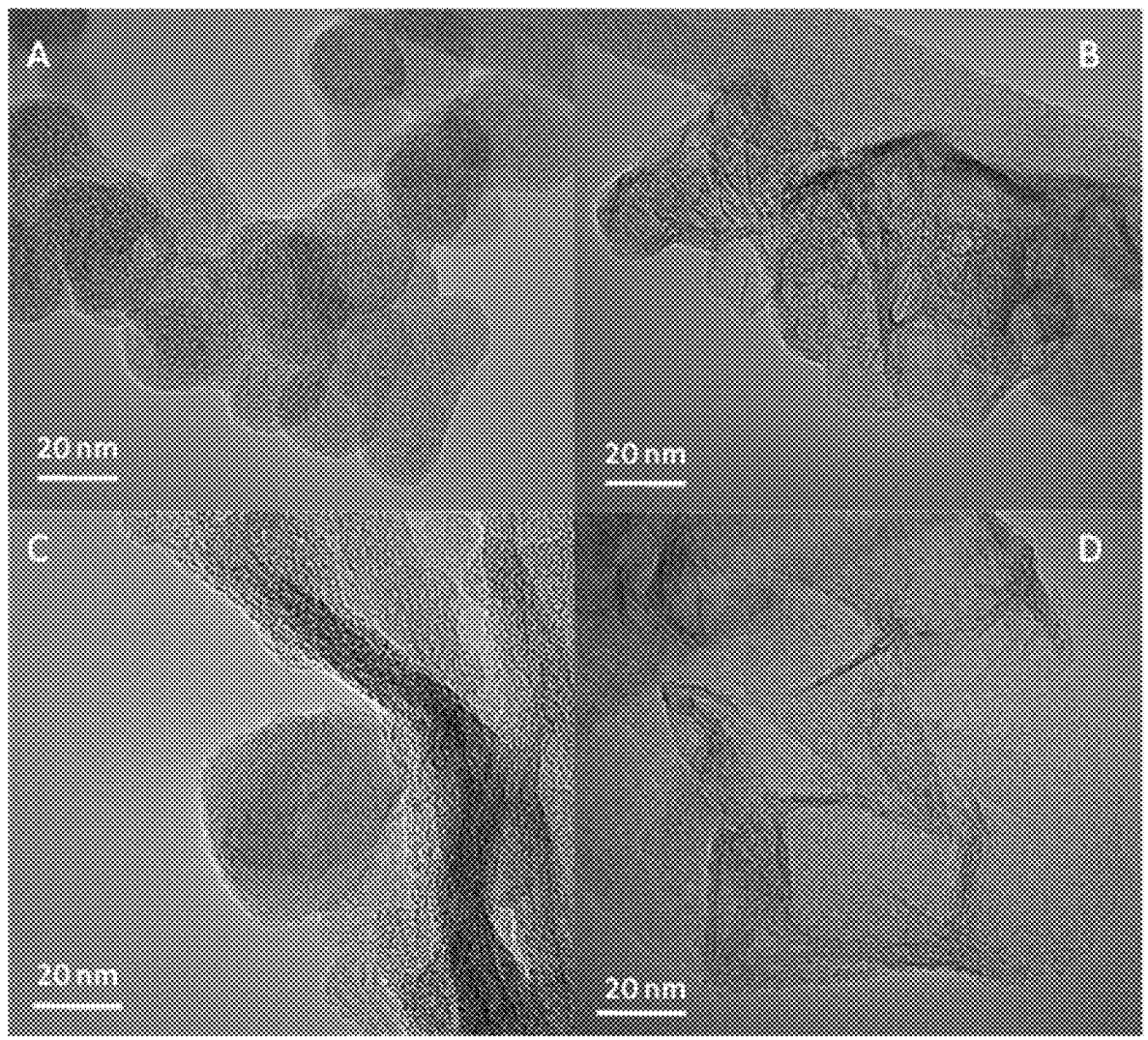
FIG. 4 illustrates the TEM images of graphitic materials obtained by processing of methane in the presence of $H_2$ at a molar ratio of 2.5:1, according to an embodiment (TEM images (A) amorphous spheres possessing internal structure (B) fused semi-graphitic polyhedral particles and NG sheets, (C) a polyhedral particle along the edge of an NG sheet with an amorphous edge and (D) folded NG sheets).

In another example, a molar ratio of 2.5:1 for $CH_4:H_2$ in a feedstock material lead to an increase in the formation of semi-graphitic particles particularly fused to the edges of the nano-graphene sheets. Furthermore, the amorphous spheres were found to have increased level of internal structure (recognizable short lamellae), the semi-graphitic particles were found to have better lamellae definition, and the nano-graphene sheets were folded. FIG. 4 illustrates the TEM images of the graphitic materials obtained at the molar ratio of 2.5:1 for $CH_4:H_2$. In an embodiment, the relative weight percentages of amorphous particles, semi-graphitic particles, and nano-graphene sheets at this molar ratio was found to be about 20%, about 40%, and about 40%, respectively.

Figure 5:
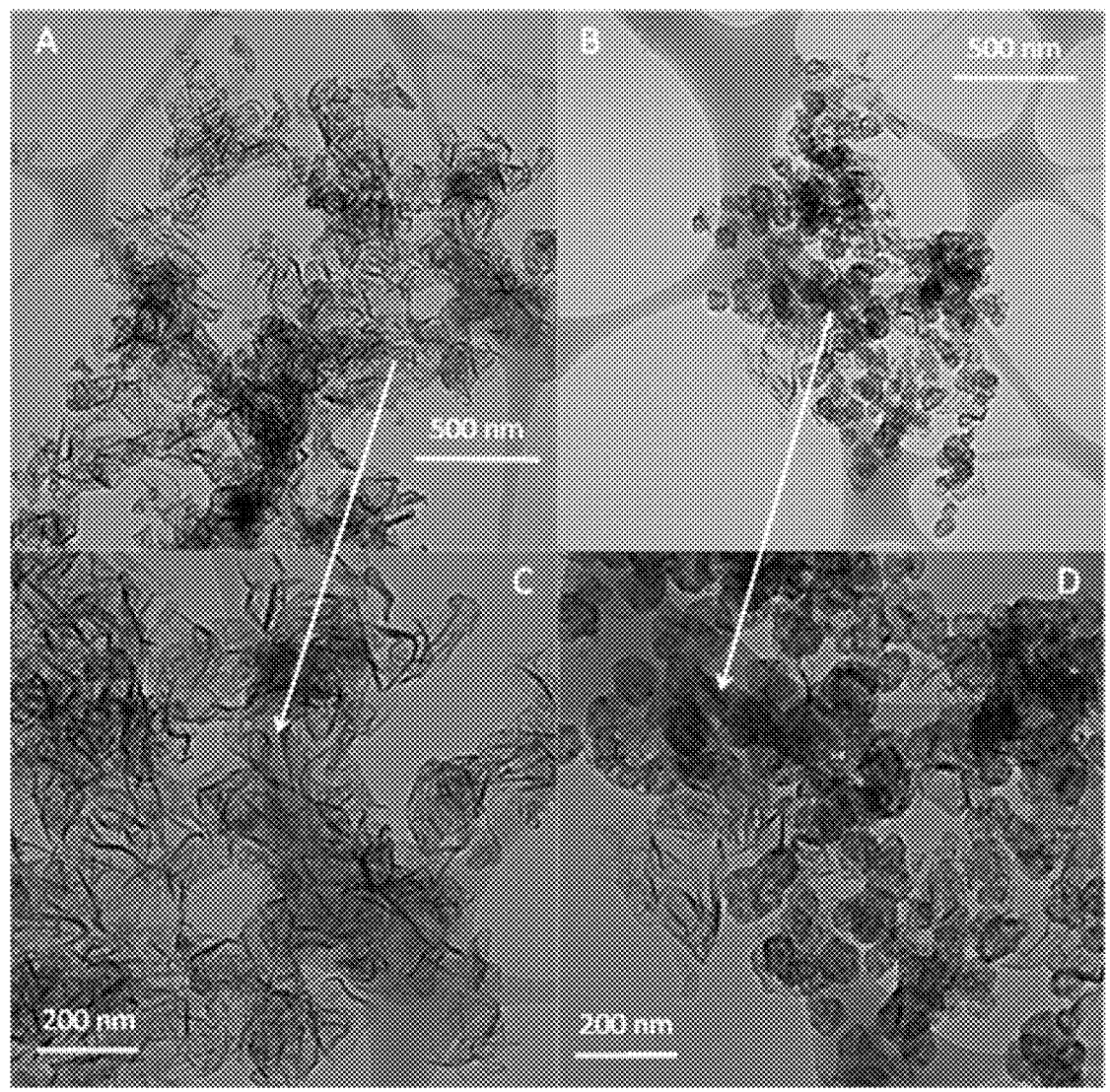
FIG. 5 illustrates the TEM images of graphitic materials obtained by processing of methane in the presence of $H_2$ at a molar ratio of 1:1, according to an embodiment (TEM images (A) and (C) show the morphology of NG sheets. (B) and (D) show semi-graphitic polyhedral particles).

In yet another example, at a molar ratio of 1:1 for $CH_4:H_2$ in a feedstock material lead to the disappearance of amorphous spheres and an overall increase in the graphitic content of the product. Furthermore, the number of nano-graphene layers in the stacks was found to be lesser (e.g., 2-6 layers). FIG. 5 illustrates the TEM images of the graphitic materials obtained at the molar ratio of 1:1 for $CH_4:H_2$. In an embodiment, the relative weight percentages of amorphous particles, semi-graphitic particles, and nano-graphene sheets at this molar ratio was found to be about 0%, about 50%, and about 50%, respectively.

As such, increasing the $H_2$ ratio in the feedstock material lead to an increase in the graphitic content of the product as is evident from the high fraction of graphitic particles and absence of amorphous particles in the above example embodiments. Furthermore, increasing the concentration of $H_2$ in the feed stream increases both the phase purity and phase quality of graphene and graphitic particles in the product. For example, as the hydrogen content in the feedstock material is increased, the nano-graphene sheets become relatively flatter with improved edge definition and stacking uniformity. Furthermore, the number of layers in the stacks reduces leading of high crystallinity of the nano-graphene sheets. The $sp^2$ character also increases with increasing $H_2$ in the feed stream which is an indication of improvement in the quality of nano-graphene formed. Similarly, the internal structure (e.g., lamellae length) increases for the graphitic particles.

Referring back to FIG. 1, a conduit 144 may be provided in communication with a side of the reaction vessel 142 that does not include the interface element 110. The conduit 144 may control and/or facilitate egress of material(s) from the reaction vessel 142, including egress of material(s) from the reaction zone 104. Namely, the conduit 144 controls egress of a stream 134 from the reaction zone 104. The stream 134 may include, but is not limited to, the product including graphitic materials, the plasma forming material (e.g., unconverted, extinguished non-thermal plasma, etc.), the feedstock material (e.g., unconverted, partially converted, etc.), and combinations thereof. In one embodiment, the conduit 124 may be, but is not limited to, a pipe, a tube, an orifice, a channel, a nozzle, an outlet, and combinations thereof. The positioning of the conduit 144 is for illustration purposes and should not be considered limiting. Accordingly, the conduit 144 controls egress of materials from the reaction zone 104.

In one embodiment, the bulk temperature of the stream 134 may be about 75 to about 2800° C., about 200 to about 1300° C., about 300 to about 1000° C., or about 400 to about 700° C. In one embodiment, the bulk temperature of the stream 134 is obtained prior to cooling of the stream 134 and measured to be between 300 and 500° C. In one embodiment, a residence time of the reactants (i.e., the feedstock material and/or the process gas) within the reaction zone 104 is between 15 milliseconds and 30 seconds.

In one embodiment, at least a portion and/or a component of the stream 134 may be returned to the reaction zone 104 through a conduit (not shown) for recycling. Accordingly, the stream 134 may include effluent egressing from the reaction zone 104.

The conduit 144 may be operatively coupled to a container 151 to collect the product. The container 151 may be any known or conceivable material capable of withstanding heat, pressure(s), and the chemical environment(s) associated with the product. For example, the container 151 may be constructed of, but is not limited to ceramics, and metals or metal alloys, such as brass, copper, steel, nickel, stainless steel, titanium, and aluminum. In one embodiment, the vessel 142 is oriented such that particles (e.g., solids, liquids of product, etc.) free-fall through the conduit 144 (e.g., down-flow). In one embodiment, the vessel 142 is oriented such that particles (e.g., solids, liquids of products, etc.) require an applied force to exit in stream 134 in the conduit 144 (e.g., up-flow). In one embodiment, the vessel 142 is oriented for a horizontal flow. Accordingly, the container 151 is configured to receive the product from the conduit 144.

Optionally, one or more conditioning devices, such as filters, membranes, settlers, centrifugal separators, distillation devices, or other processing devices may be provided between the vessel 142 and the contained 144 and/or after the container 144, described above. For example, a separator (e.g., a cyclone separator) and/or a filtration system may be used to collect entrained graphitic material particles before exhausting the remaining stream 134.

In one embodiment, the plasma forming material and/or feedstock material may include an additive such as, but are not limited to, carbon black, coal, biochar, biomass, graphite, coke, structured carbon, carbon dioxide, carbon monoxide, and hydrogen, nitrogen, lithium, and/or boron. The additive may accelerate the conversion of the feedstock material to the product, facilitate selectivity of a specific product, or facilitate improvement of the product by chemical, structural or other means. In one embodiment, the additive is exposed to the microwave radiation, the non-thermal plasma 125, and/or the dense plasma head 125(a). In one embodiment, the additive is upgraded to a third material responsive to the exposure. In one embodiment, the upgrading may change the chemical, physical, and/or structural properties of the additive. For example, conductivity of the additive can be increased through re-ordering and/or functionalization of the additive's surface or bulk structure (e.g., carbon black may be upgraded to conductive carbon black). In one embodiment, the additive's surface area and/or porosity may be altered (carbon to activated carbon). In one embodiment, graphite may be upgraded to, but not limited to, a graphene sheet. In one embodiment, the additive increases conversion of the feedstock material to product. Accordingly, an additive may be added to the system for accelerated and/or increased conversion of the feedstock material and/or generation of a third material. In one embodiment, the additive may prevent formation of particular structures (e.g. amorphous carbon) facilitating an increase in production of more desirable structures (e.g. graphene platelets).

Figure 6:
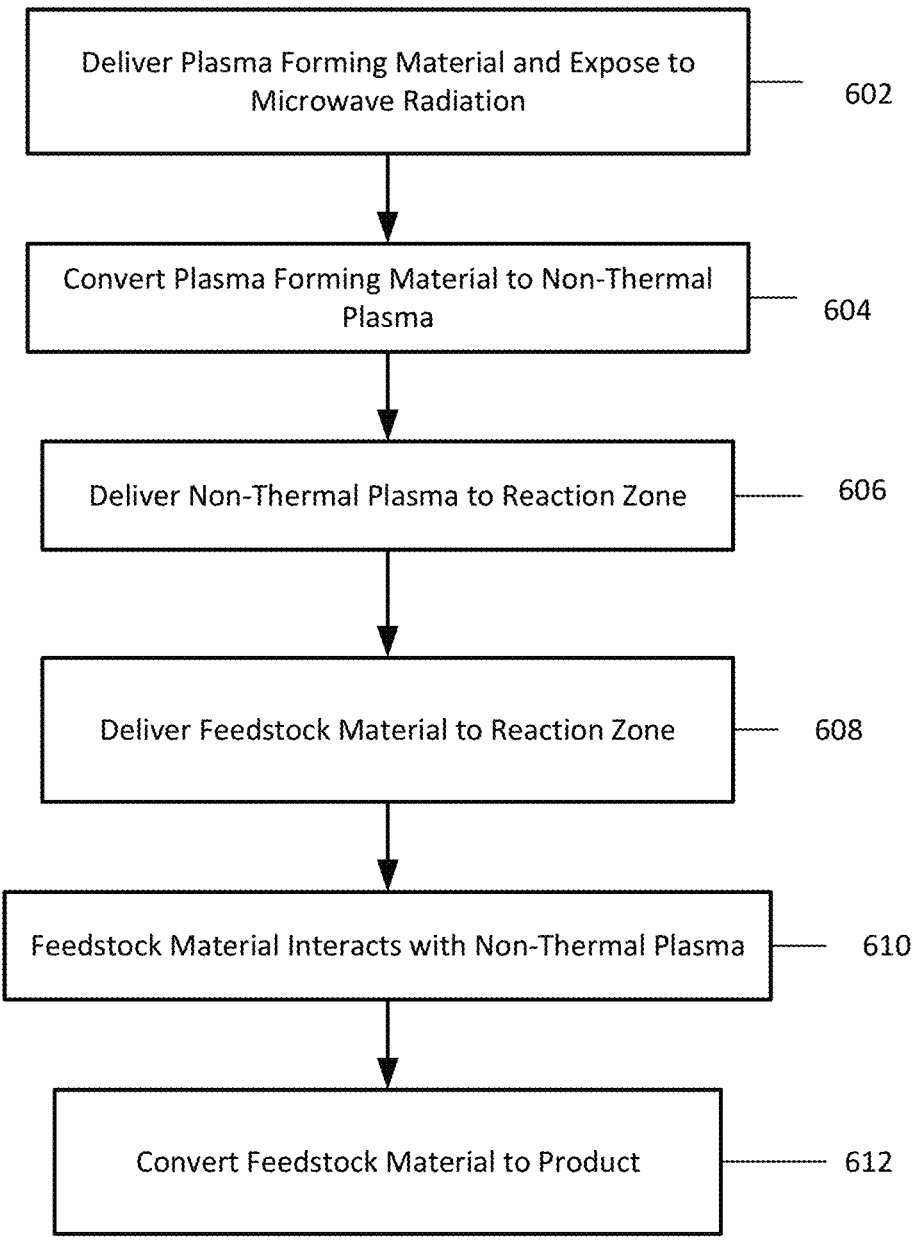
FIG. 6 depicts a flow chart illustrating a method for processing the precursor material into the product utilizing the non-thermal plasma.

Referring to FIG. 6, a flow chart 600 is provided illustrating a method for processing the feedstock material into the product comprising graphitic materials utilizing the non-thermal plasma. While the processing method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, or the steps may be performed in the order disclosed or in an alternate order.

At 602, a plasma forming material may be delivered (e.g., provided) to a plasma forming zone and exposed to microwave radiation. The exposure of the plasma forming material to the microwave radiation may selectively convert the plasma forming material to a non-thermal plasma including formation of one or more streamers and/or diffused plasma at 604. Accordingly, the non-thermal plasma, including the one or more streamers, is generated within the reaction zone from the plasma forming material.

At 606, the non-thermal plasma may be delivered to a reaction zone in the form of the dense plasma head via an interface element. At 608, a feedstock material may be delivered (e.g., provided) to the reaction zone. In one embodiment, at least one of the plasma forming material and the precursor material includes an additive such as, but not limited to, carbon black, coal, biochar, biomass, graphite, structured carbon, carbon dioxide, carbon monoxide, and hydrogen.

The feedstock material may interact with the non-thermal plasma (610). During the interaction the feedstock material is exposed to the non-thermal plasma including exposure to the one or more streamers. In one embodiment, the exposure of the feedstock material to the microwave radiation is initiated prior to exposure of the feedstock material to the non-thermal plasma. The exposure of the feedstock material to the non-thermal plasma (and optionally the microwave radiation) selectively converts the feedstock material to a product comprising graphitic materials (612). Accordingly, the feedstock material is selectively converted into the product by the non-thermal plasma.

It should be noted that while the above disclosure describes the conversion of feedstock material to products comprising graphitic materials, the systems and methods of the current disclosure may also be used for the production of other products such as, without limitation, products of acetylene hydrogenation, ammonia, or other types of chemicals.

Acetylene Hydrogenation:

The systems and methods described above may be used for hydrogenation of acetylene to ethylene and other hydrogen-enriched carbon-based compounds. The reaction may be carried out in the presence or absence of a catalyst bed. In an embodiment, a catalyst bed may be added to the reaction vessel to promote or facilitate hydrogenation of a feedstock gas stream. The bed of catalyst material may include a transition metal, such as, without limitation, titanium, nickel, copper, zinc, gold, silver, platinum, palladium, or iron, on a support material. Examples of support material may include, without limitation, activated carbon, glass beads, alumina, and/or silicon dioxide pellets. In an example embodiment, when a feedstock gas stream containing acetylene and hydrogen is passed into the reaction vessel containing a fluidized bed of catalyst (e.g., nickel supported by activated carbon), the acetylene may be hydrogenated in the presence of the dense plasma head into ethylene and other hydrogen-enriched carbon-based compounds. The ratio of the mass of transition metal to catalyst support material may be about 1% to about 100%, more preferably about 5% to about 50%, and most preferably about 10% to about 25%.

In one embodiment, the GHSV, for the hydrogenation reaction, calculated based on the volumetric flow rate divided by the un-packed volume of catalyst bed is about 100 $hr^{-1}$ to about 1,000 $hr^{-1}$, but more preferably about 1,000 $hr^{-1}$ to about 10,000 $hr^{-1}$. In an embodiment, the bed of catalyst material may be heated by direct contact between the non-thermal plasma or by other means to a temperature about 500 Kelvin to about 10,000 Kelvin, more preferably about 500 Kelvin to about 1000 Kelvin.

Ammonia Production:

In conventional chemistry, synthesis of ammonia is performed via the Haber-Bosch process and proceeds at relatively high pressures of 60-180 bar and relatively high temperatures of 673-773 Kelvin over a bed of metal catalyst material. The fundamental reaction can be described as: $N_2+3H_2\rightarrow 2NH_3$. It is well known that diatomic nitrogen ($N_2$) is very unreactive due to the strength of its triple bond. As such, there is a need for systems and methods that can provide energies high enough for the disassociation of the triple bond. Non-thermal plasmas generated in the systems and methods of the current disclosure can be used for production of ammonia because non-thermal or non-equilibrium plasmas can readily achieve electron energies high enough to dissociate diatomic nitrogen (9.79 eV/bond at 298 Kelvin).

In one embodiment, a nitrogen containing feedstock is used in conjunction with a hydrogen-containing feedstock for the synthesis of ammonia using non-thermal plasma. The molar ratio of nitrogen to hydrogen of may be about 1:1 to about 1:5, and preferably about 1:3. In one embodiment, for production of ammonia, nitrogen and/or hydrogen containing feedstock is dissociated via direct contact with the dense plasma head within the reaction zone, which are then recombined to form ammonia vapor. In one embodiment, the reaction vessel may include a catalyst capable of facilitating the recombination of ammonia from nitrogen and/or hydrogen-containing radicals. An example catalyst may include an iron-containing compound in addition to a promotor material such as, without limitation, potassium oxide, calcium oxide, silicon dioxide, aluminum oxide, and/or other oxides. In one embodiment, for the production of ammonia, the pressure in the reaction vessel is about 0.5 bar to about 1.5 bar. In another embodiment, the reaction vessel may be about 10 bar to about 100 bar, more preferably, about 1.5 bar to about 10 bar. In one embodiment, the temperature of reaction vessel is maintained between 500 Kelvin and 1000 Kelvin to facilitate ammonia recombination.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Microwave radiation is utilized to generate a non-thermal plasma including streamers to facilitate the conversion of the precursor material(s) to the product(s) while minimizing carbon build up and/or energy consumption. In one embodiment, the streamers enable the same (or higher) conversion rates and/or product selectivity than prior processes (e.g., thermal plasma) with a lower microwave radiation density within the reaction zone than the prior processes.

It will be appreciated that, although specific embodiments have been described herein for purposes of illustration, various modifications may be made without departing from the spirit and scope of the embodiments. In particular, the vessel may be configured in a variety of flow configurations and orientations. For example, the first conduit may be in communication with a proximal side of the vessel that is oppositely positioned to a distal side of the vessel that the second conduit is in communication with. Accordingly, the scope of protection of these embodiments is limited only by the following claims and their equivalents.

What is claimed is:

1. A system for plasma based synthesis of hydrocarbon products, the system comprising:
    a plasma forming zone configured to generate a plasma from radio-frequency radiation, the plasma forming zone configured to transmit the plasma formed within a discharge tube to a reaction zone via a first path that includes an interface element;
    a feedstock source in fluid communication with the reaction zone via a second path; and
    the reaction zone configured to receive the plasma, wherein the reaction zone is further configured to:
        receive, from the feedstock source via the second path, feedstock material comprising a carbon containing species, and
        convert the feedstock material to a product in presence of the plasma.

2. The system of claim 1, wherein the plasma forming zone comprises a radiation source that is coupled to the discharge tube, wherein the discharge tube is made from a conductive material.

3. The system of claim 1, wherein the discharge tube is configured to receive a plasma forming material, wherein the plasma forming material includes one or more first materials selected from the group consisting of: argon, hydrogen, helium, neon, krypton, xenon, carbon dioxide, nitrogen, and water.

4. The system of claim 3, wherein a dielectric strength of the plasma forming material is less than a dielectric strength of the feedstock material.

5. The system of claim 2, further comprising a waveguide configured to couple the radiation source to the discharge tube.

6. The system of claim 1, wherein the product comprises at least one of the following: graphitic materials, molecular hydrogen, olefins, phenols, alcohols, amines, alkyl hydrocarbons, or aromatic hydrocarbons.

7. The system of claim 1, wherein the reaction zone comprises a reaction vessel including a resonant cavity, and wherein the reaction vessel is formed from material that is opaque to the radio-frequency radiation.

8. The system of claim 7, wherein the feedstock material is introduced into the reaction zone in a tangential direction with respect to one or more walls of the reaction vessel.

9. The system of claim 1, wherein the plasma transmitted from the plasma forming zone to the reaction zone forms a dense plasma head that is configured to transmit the radio-frequency radiation from the plasma forming zone to the reaction zone.

10. The system of claim 1, further comprising a reaction tube configured to surround the discharge tube and form an annulus, wherein the feedstock material flows in the annulus through the plasma forming zone before entering the reaction zone.

11. The system of claim 1, wherein the feedstock material is introduced directly into the reaction zone without being exposed to the radio-frequency radiation in the plasma forming zone.

12. The system of claim 1, wherein the reaction zone is further configured to receive a process gas having a dielectric strength that is greater than a dielectric strength of a plasma forming material.

13. The system of claim 12, wherein the plasma forming material includes one or more first materials selected from the group consisting of: argon, hydrogen, helium, neon, krypton, xenon, carbon dioxide, nitrogen, and water.

14. The system of claim 1, wherein the system further comprises a catalytic bed within the reaction zone, the catalytic bed being a static bed or a fluidized bed.

15. The system of claim 1, wherein the plasma comprises at least one of the following: a non-thermal plasma comprising a plurality of streamers or a diffused volumetric plasma.

16. The system of claim 1, wherein the feedstock material further comprises molecular hydrogen such that a molar ratio of the carbon containing species to the molecular hydrogen is about 5:1 to about 1:1.

* * * * *